United States Patent [19]

Zajc

[11] 3,867,877

[45] Feb. 25, 1975

[54] SPIT BASKET AND SUPPORT THEREFOR

[76] Inventor: Ludwig J. Zajc, 3262 Royalton Rd., North Royalton, Ohio 44124

[22] Filed: Nov. 8, 1973

[21] Appl. No.: 413,769

[52] U.S. Cl.............. 99/402, 99/393, 99/421 HV, 292/251, 292/256.71,
[51] Int. Cl. .......................................... A47j 37/08
[58] Field of Search ............ 99/385, 393, 395, 399, 99/402, 419, 421 HV; 220/19, 55 J, 55 K; 292/251, 256.71; 24/103 269/237;244

[56] References Cited
UNITED STATES PATENTS 2,924,037  2/1960  Patrick................................. 24/103
3,188,939  6/1965  Smith.................................... 99/402

Primary Examiner—Harvey C. Hornsby
Assistant Examiner—Robert Pous

[57] ABSTRACT

A spit basket for a barbecue set composed of a wire rod tray enclosed by side walls and a top closure panel that is pivotably secured to the side walls at one end and at the opposed end carried and raised and lowered by a helical coil spring secured within the side wall. An H-frame supports a spit bar with the tray being adapted to receive bars of different dimensions.

11 Claims, 7 Drawing Figures

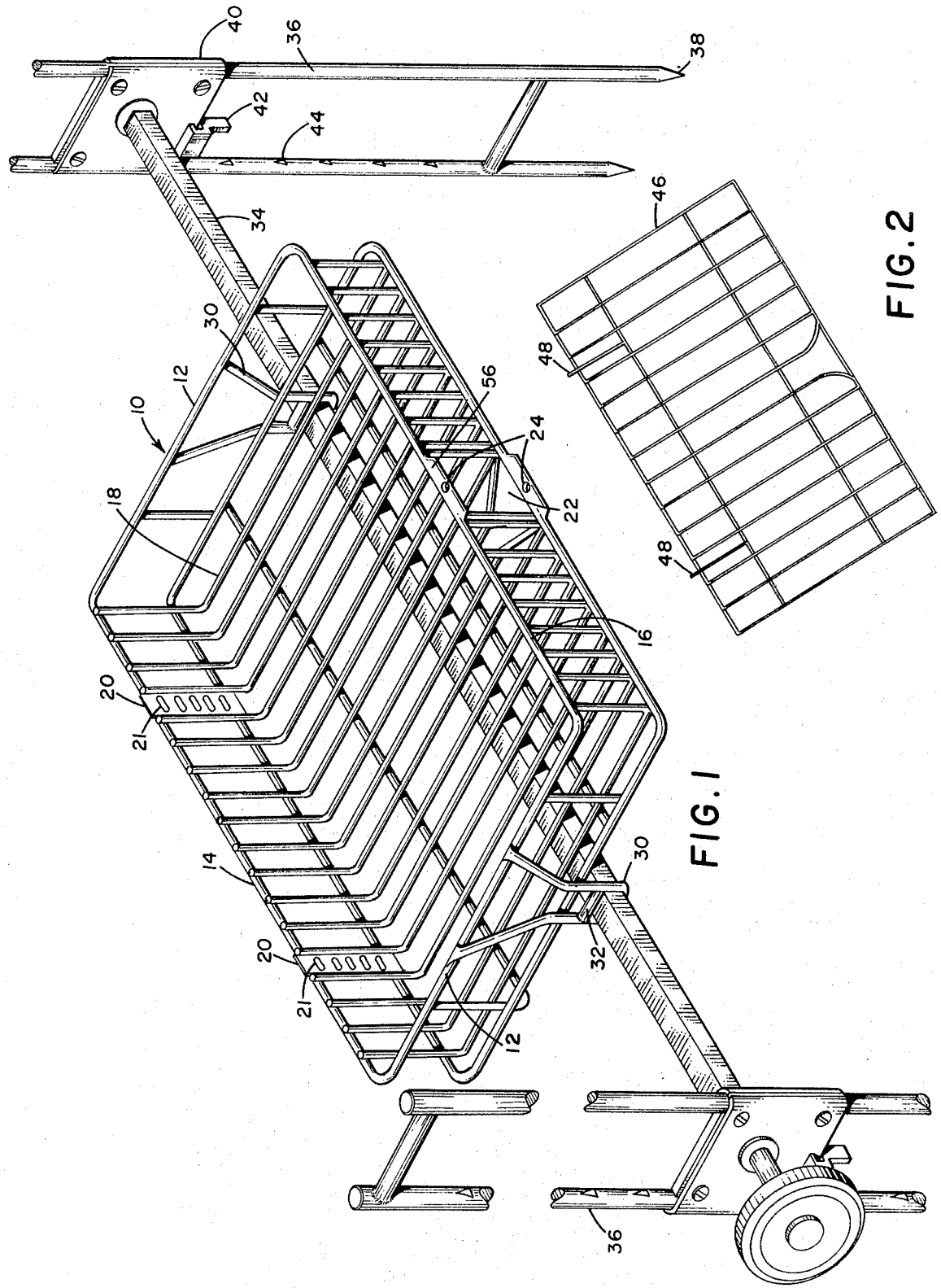

SPIT BASKET AND SUPPORT THEREFOR

The present invention relates to a universal spit basket for outdoor barbecue grills. The spit basket can be utilized with existing barbecue grills or with ground support accessories as disclosed herein.

Spit baskets are already well known in the art. They are conventionally utilized as a receptacle for food, such as meat, which is to be barbecued over fire. In such applications it is of paramount importance that the food be properly positioned within the basket or tray so that it can be uniformly exposed to the heat or fire until it has reached the desired condition. In the prior art there have been a number of attempts to place the top closure member of the basket in a position whereby the same restrains the movements of the food, for instance, see U.S. Pat. Nos. 2,983,218 and 2,895,408. In these two patents there is shown a top closure panel which can be moved, elevationally, to several predetermined levels. Since the food in the tray is often of unequal heights, and the number of levels are just a few, the desired restraint is frequently not achieved. Moreover, the limited degree of elevational freedom of movement, at least in the latter patent, is achieved at the expense of structural rigidity, as the front panel is hingeably secured and clamped to the side walls to allow for movement of the cover or closure panel. The U.S. Pat. No. 3,188,939 discloses a still further attempt to provide a plurality of elevational settings for the cover panel. One end of the cover protrudes through two horizontally spaced wires of one side wall while the other end is secured through a fastener which protrudes at the same elevation, between two wires of the opposite side wall. The amount of tension that can be imparted upon the food is again limited by the predetermined settings. A still further attempt to achieve securely placed food within the basket is shown in U.S. Pat. No. 3,363,543, in which a spring protrudes into the tray basket and bears directly upon the food. While this approach may have some advantages for a single piece of food, its shortcomings relative to a tray full of (e.g.) hamburgers is readily apparent.

It is the main object of the present invention to provide a spit basket which is adapted to receive food and to securely confine the same within the tray.

It is a still further and more specific object of the invention to provide a spit basket in which the elevational level of the closure or cover panel can be adjusted to a much greater degree than heretofore possible and at each level of the cover panel the food can be placed under pressure or bias by the panel. The top panel can be slanted to compensate for variations in the heights of the food. The present invention also eliminates the need for movable side walls or end walls in order to accomplish the closing and confinement of the closure panel.

It is a still further and more specific object of the present invention to provide a spit basket in which the closure panel is under a spring bias.

It is a still further object of the present invention to provide a spit basket which can be associated with spit bars of various construction.

And it is a still further object of the present invention to provide a support for the spit basket.

An aspect of the present invention resides in the provision of a spit basket for a barbecue grill which includes an open top tray having a bottom and elevational side wall or walls extending upwardly from the bottom thereby establishing a receptacle for food which is to be barbecued. A top closure panel within the tray co-extends substantially with the surface of the bottom panel of the tray. The closure panel is formed of a grid-like or wire-like construction. The closure panel has one or more projections which extend beyond the general periphery of the top panel. The tray also includes one or more elongated brackets secured to and extending substantially parallel with the side wall or side walls of the tray and each bracket has a plurality of vertically, substantially aligned openings with each bracket receiving one projection for pivotably securing one end of the closure panel at a predetermined location within the tray. There is further provided a helical coil elevation and tension adjusting member rotatably secured generally within the side wall at a location generally opposed to the bracket(s). The coil has a plurality of loops projecting partly into the tray with the axis of elongation of the coil being substantially parallel to the side wall. The adjusting member is effective to carry the closure panel on the top loop and upon rotation thereof to force the panel downwardly between the loops until the desired panel elevation and bias upon the food has been attained.

For a better understanding of the present invention, together with other and further objects thereof, reference is had to the following description taken in connection with the accompanying drawings, and its scope will be pointed out in the appended claims.

In the drawings:

FIG. 1 is a perspective view of the spit basket and support members therefor;

FIG. 2 is a top view of the closure panel;

Figure 4A:
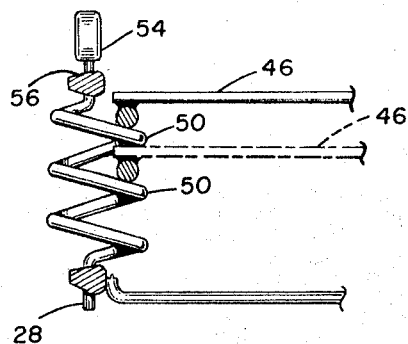
FIG. 4a is in part a cross sectional view of the front side wall and an elevational view of the coil spring in the wall and the relative position of the top panel.
Figure 4:
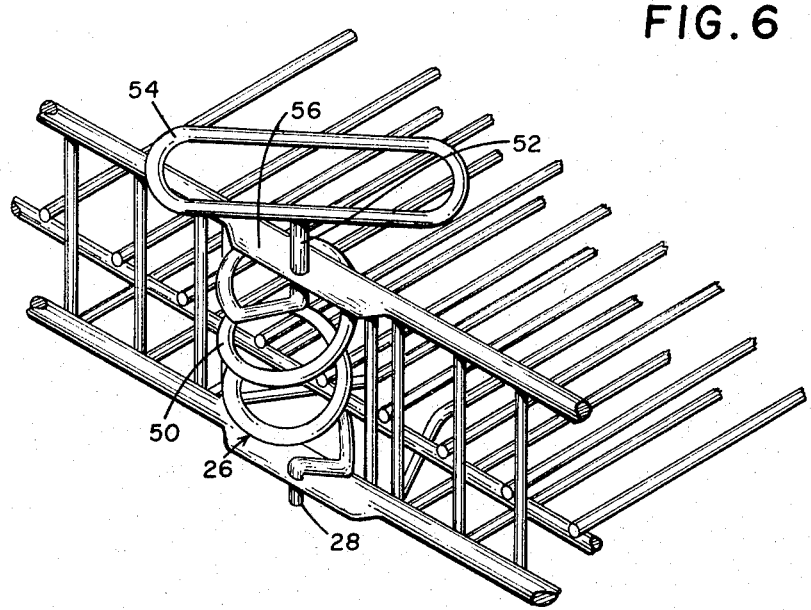
FIG. 4 is a fragmentary, perspective view, of the tray, closure panel and helical coil elevation and tension adjusting member in situ.

Referring now more specifically to the drawings there is shown a spit basket for a barbecue grill which includes an open top tray 10, as shown in FIG. 1. While the tray, in the preferred embodiment, is of rectangular configuration and thus includes two end walls 12, a back wall 14 and a front wall 16, all extending at right angles from a flat bottom 18, the invention does not require that the tray be of such rectangular shape, as will hereafter become more apparent. As shown, the walls 12, 14 and 16 are continuous and thereby provide significant structural rigidity. As is conventional in spit baskets, the tray 10 is a grid-like, wire rod construction. The back panel is provided with two brackets 20 which are clamped to the upper and lower wire rod to provide an arrangement whereby each bracket extends substantially parallel to the plane of the side wall. Each bracket 20 is provided with a plurality of vertically, substantially aligned, openings 21. For rectangularly shaped trays it will be advantageous to have one or more such brackets 20 while other configurations, such as a round tray, may require only a single bracket. In the opposed (front) side wall 16 there is provided a gap 22 between two vertically extending wire rods to receive in this gap 22 and through aligned openings 24 a helical coil elevation and tension adjusting member 26 which is shown in FIG. 4. The bottom opening 24, see FIGS. 1, 4 and 4a, is adapted to receive a vertical rod extension 28 of the adjusting member 26 with the upper end being supported in and retained by the upper opening 24, as hereinafter further discussed.

Figure 5:
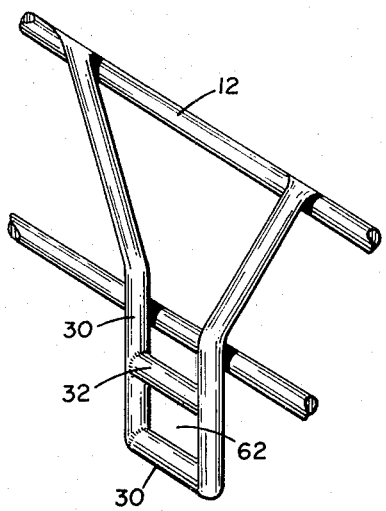
FIG. 5 is a fragmentary, perspective view, illustrating a U-shaped support member partially shown in FIG. 1 for holding the spit bar.

The tray further includes a U-shaped support member 30, see FIGS. 1 and 5, which is constituted by two downwardly extending, spaced, rods forming a U-shaped end which at its intermediate vertical level is joined by a transversely extending connecting rod 32, thereby forming essentially a square opening 62. The two support members are adapted to receive therethrough a spit bar 34 which at its opposed ends is supported by an H-frame structure 36. The H-frame structure has pointed ends 38 to permit the structure to be inserted into the ground and a vertically movable member 40 which is adapted to lower and raise the spit bar together with the basket to predetermined elevations. The member 30 has a latch 42 which is spring biased (not shown) to cause the member to be supported against an abutment or cut-out 44, located on the inside of the frame member, as shown in FIG. 1.

Figure 3:
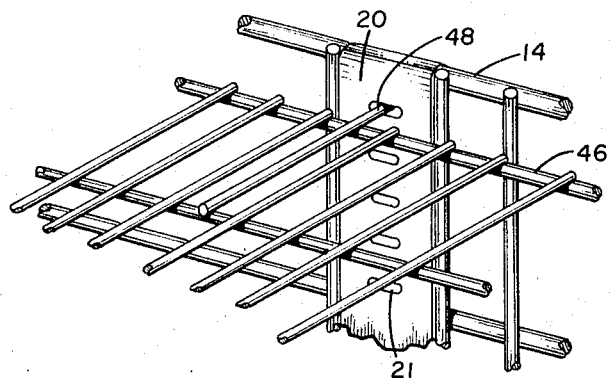
FIG. 3 is a perspective, fragmentary, view showing the closure panel secured to bracket(s) which form part of the side wall.

Referring now specifically to FIG. 2, there is shown a top closure panel 46 which fits within the tray and substantially co-extends with the two ends of the bottom surface of the tray. The closure panel 46, depending upon its geometric configuration, is provided with one or more outwardly extending projections 48. Generally, these projections 48 extend beyond the general periphery of the closure panel and are intended to be inserted into openings 21 of bracket(s) 20 at a time when the cover is to be placed onto the tray. A more detailed illustration of this arrangement is shown in FIG. 3. It will be appreciated that the projections 48 may be inserted in any one of the openings 21 at the same elevation thereby supporting one end of the closure panel. For simplicity of construction, each bracket 20 can be clamped with its end over the upper and lower wire of the side wall 14.

Reference is made again to FIG. 4 in which the helical coil elevation and tension adjusting member 26 is shown in situ. The coil 26 is rotatably secured generally within the front wall 16 and includes a plurality of loops 50 projecting into the tray 10 with the axis of elevation of the coil, which is formed by the loops, being substantially parallel to the plane of the front wall 16. As already above mentioned, the bottom end of the coil 26 extends a vertical member 28 which connects to the bottom loop and the uppermost loop is connected to a vertically extending member 22 which terminates into a handle 54 located vertically above the front wall 16. The adjusting member can be made in two parts, for instance, with the handle portion 54 and 52 constituting one part which is threadedly secured with the uppermost loop, or, alternatively, the forwardly projecting portion 56 of the front wall 16, which is provided with opening 24, can be made detachable in order to facilitate the installation of the coil spring.

FIG. 4a shows that when the handle 54 is aligned with the wall 16, the closure panel 46 can be readily inserted into the tray 10. As is clearly obvious from FIG. 4a, the loops of the adjusting member 28 extend partly into the tray and, initially, upon inserting the closure panel 46 into the tray, the closure panel rests upon the upper loop. Upon rotation of the handle 54, the closure panel 46 is forced downward and between two loops 50, see phantom line, and further rotation will cause the closure member to be moved completely downward until the same either makes contact with the tray bottom in the event that the food is extremely flat, or comes into tensional abutting engagement with the food. The adjusting member can be further rotated in order to attain these desired elevations for the closure panel 46 and the desired pressure which the closure panel is supposed to exert upon the food. The reverse rotation will raise and releast the top panel. The spring-like loops of the adjusting member thus function, in part, as a support or carrier as well as a spring to impart a certain degree of bias to the position of the closure panel 46. As will be noted from the earlier description, the opposite (back) side of the closure panel is pivotably secured into openings 21 of bracket 20 so that the combination of the two elevation determining devices provides the utmost in flexibility without sacrificing any rigidity with respect to the tray 10. As will also be obvious from the foregoing, the closure panel, in situ, will either be coplanar with the bottom 18, or at a slight angle depending upon the number of openings 21 provided for in bracket 20.

Figure 6:
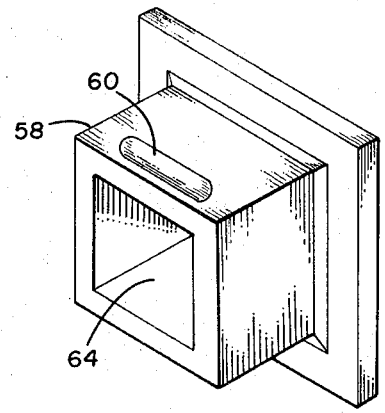
FIG. 6 is a perspective view of an insert for the support member shown in FIG. 5.

The spit basket of the present invention is usable with numerous designs of existing barbecue sets. In order to further facilitate the utility of the spit basket with respect to existing spit bars 34 the tray 10 is provided with the support member 30,32, as already above described, so that the same may receive an insert 58, see FIG. 6, which fits into the U-shaped support 30 and is clamped thereto by means of groove 60 which engages rod 62. The support insert 58 is intended to compensate for dimensional differences between the thickness or geometric configuration of other spit bars and the opening 62 of the support member 30.

In order to advance the universality of the spit basket the same can be provided with a plurality of such inserts 58 having openings 64 of different geometric dimensions.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A spit basket for a barbecue grill comprising:
an open top tray having a bottom and an elevational side wall or walls extending upwardly from said bottom providing substantially continuous periphery and thereby establishing a receptacle for food;
a top closure panel within said tray fitting between said wall or walls;
said tray and said closure panel having a grid-like wire construction;
said closure panel having one or more projections extending beyond the general periphery thereof;
one or more elongated brackets secured to said side wall or walls, each bracket having a plurality of vertically substantially aligned openings adapted for receiving one said projection for pivotably securing one end of said closure panel at a predetermined elevation within the tray;

a helical coil elevation and tension adjusting member rotatably secured generally within the side wall at a location generally opposed to said bracket(s), said coil having a plurality of loops projecting into the tray with the axis of elongation of the coil being substantially parallel to the plane of the side wall, said adjusting member being effective upon rotation thereof to carry the closure panel on the top loop and upon further rotation to force said panel downward between loops until the desired panel elevation and bias has been reached.

2. A spit basket according to claim 1, wherein said adjusting member includes a handle extending upwardly beyond the upper adjacent periphery of the side wall.

3. A spit basket according to claim 2, and a rod extending from the handle through the side wall and connecting to the loops.

4. A spit basket according to claim 2, wherein the bottom end of said adjusting member is rotatably confined within the side wall.

5. A spit basket according to claim 1, wherein said tray is rectangular and has rigidly connected opposed end walls and opposed front and back walls, and wherein said adjusting member is located in the front wall.

6. A spit basket according to claim 1, wherein said projection of said closure panel is pivotably secured within the opening of a bracket.

7. A spit basket according to claim 1, two U-shaped support members opposedly located on and extending downwardly from side wall and effective for receiving a spit bar.

8. A spit basket according to claim 7, and a support insert within each said support members effective to compensate for dimensional differences between the thickness of the spit bar and the opening of the support members.

9. A spit basket according to claim 7, in combination with a spit bar extending through and beyond both of said support members; and an H-frame structure at each opposing end of said spit bar, for receiving and supporting the bar and the tray.

10. A spit basket according to claim 9, wherein said H-frame includes vertically movable support means engaging said spit bar.

11. A spit basket according to claim 10, wherein said H-frame has pointed ends at the bottom thereof to permit insertion thereof into the ground.

* * * * *